US012691563B2

(12) United States Patent
Li et al.

(10) Patent No.: US 12,691,563 B2
(45) Date of Patent: Jul. 28, 2026

(54) TORQUE OUTPUT TOOL

(71) Applicant: Nanjing Chervon Industry Co., Ltd., Nanjing (CN)

(72) Inventors: Chunrui Li, Nanjing (CN); Shubin Tong, Nanjing (CN); Hejun Wang, Nanjing (CN); Hanqing Zheng, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 142 days.

(21) Appl. No.: 17/957,039

(22) Filed: Sep. 30, 2022

(65) Prior Publication Data

US 2023/0019359 A1 Jan. 19, 2023

Related U.S. Application Data

(63) Continuation-in-part of application No. PCT/CN2021/103148, filed on Jun. 29, 2021.

(30) Foreign Application Priority Data

Jun. 30, 2020 (CN) ......................... 202010612057.2
Sep. 30, 2021 (CN) .......................... 202111164496.2

(51) Int. Cl.
*B25F 5/00* (2006.01)
*B25B 21/00* (2006.01)
*B25F 5/02* (2006.01)

(52) U.S. Cl.
CPC ............ *B25F 5/001* (2013.01); *B25B 21/007* (2013.01); *B25B 21/008* (2013.01); *B25F 5/02* (2013.01)

(58) Field of Classification Search
CPC ............................ B25B 21/007; B25B 21/008
See application file for complete search history.

(56) References Cited

U.S. PATENT DOCUMENTS

2013/0167691 A1 7/2013 Ullrich
2017/0182648 A1 6/2017 Mao
(Continued)

FOREIGN PATENT DOCUMENTS

CN 201093036 Y 7/2008
CN 201309010 Y 9/2009
(Continued)

OTHER PUBLICATIONS

ISA/CN, Int. Search Report issued on PCT application No. PCT/CN2021/103148, dated Sep. 26, 2021, 3 pages.
(Continued)

*Primary Examiner* — Daniel Jeremy Leeds
(74) *Attorney, Agent, or Firm* — Greenberg Traurig, LLP

(57) ABSTRACT

A torque output tool includes an output shaft, a motor, a transmission assembly, and a gearbox. The gearbox is used for accommodating the transmission assembly. The transmission assembly includes a first planetary gearset and a second planetary gearset. The transmission assembly is capable of being switched to a first state and a second state such that the transmission assembly outputs a first gear ratio or a second gear ratio separately, where the first gear ratio is greater than the second gear ratio. When the transmission assembly outputs the first gear ratio, a rotational speed of the output shaft is greater than or equal to 300 r/min and less than or equal to 800 r/min. A length of the gearbox in an axial direction is greater than or equal to 38 mm and less than or equal to 46 mm.

22 Claims, 13 Drawing Sheets

(56) References Cited

U.S. PATENT DOCUMENTS

| | | | | |
|---|---|---|---|---|
| 2021/0170564 | A1* | 6/2021 | Gehret .................... | B25F 5/001 |
| 2022/0193878 | A1* | 6/2022 | Tomayko ................ | B25B 21/02 |
| 2022/0314419 | A1* | 10/2022 | Kamiya .................. | B25F 5/001 |

FOREIGN PATENT DOCUMENTS

| | | | |
|---|---|---|---|
| CN | 102335907 | A | 4/2014 |
| CN | 106541167 | A | 3/2017 |
| CN | 206795699 | U | 12/2017 |
| CN | 110614393 | A | 12/2019 |
| CN | 211541097 | U | 9/2020 |
| CN | 113858135 | A | 12/2021 |
| DE | 202016107390 | U1 | 1/2017 |
| DE | 202018102385 | U1 | 5/2018 |
| EP | 2184138 | A2 | 1/2013 |
| JP | 2005014145 | A | 1/2005 |
| WO | 2019233485 | A1 | 12/2019 |

OTHER PUBLICATIONS

ISA/CN, English translation of Int. Search Report issued on PCT application No. PCT/CN2021/103148, dated Sep. 26, 2021, 3 pages.
ISA/CN, Written Opinion issued on PCT application No. PCT/CN2021/103148, dated Sep. 26, 2021, 7 pages.
ISA/CN, English translation of Written Opinion issued on PCT application No. PCT/CN2021/103148, dated Sep. 26, 2021, 4 pages.
English translation of CN 115889855 (application No. CN202111164496.2), published Apr. 4, 2023.
English translation of CN113858134 (application No. CN202010612057.2), published Dec. 31, 2021.
English translation of WO202002061 (application No. PCT/CN21/103148), published Jan. 6, 2022.

* cited by examiner

TORQUE OUTPUT TOOL

RELATED APPLICATION INFORMATION

This application is a continuation-in-part of International Application Number PCT/CN2021/103148, filed on Jun. 29, 2021, through which this application also claims the benefit under 35 U.S.C. § 119(a) of Chinese Patent Application No. CN 202010612057.2, filed on Jun. 30, 2020. This application also claims the benefit under 35 U.S.C. § 119(a) of Chinese Patent Application No. CN 202111164496.2, filed on Sep. 30, 2021, which application is incorporated herein by reference in its entirety.

BACKGROUND

A torque output tool is used for providing torque to assist a user in daily operations. Generally, a deceleration device needs to be provided between a motor and an output shaft so that the output shaft can output an appropriate rotational speed and appropriate torque. In order that the deceleration device can provide a sufficient gear ratio for deceleration, the deceleration device generally needs to be designed as a three-layer planetary gear train. The three-layer planetary gear train is not conducive to the reduction of the whole machine of the torque output tool. If a traditional double-layer planetary gear train is provided to achieve a high gear ratio, gear strength will decrease. If the double-layer planetary gear train is provided to achieve a low gear ratio, the requirement of an output system for deceleration cannot be satisfied.

SUMMARY

A torque output tool includes an output shaft, a motor, a transmission assembly, and a gearbox. The output shaft is used for outputting torque. The motor is used for driving the output shaft to rotate around a first axis. The transmission assembly is used for transmitting output of the motor to the output shaft. The gearbox is used for accommodating the transmission assembly. The transmission assembly includes a first planetary gearset and a second planetary gearset. The first planetary gearset includes first planet gears and a first planet carrier. The first planet gears are driven by the motor, and the first planet carrier is used for mounting the first planet gears. The second planetary gearset includes second planet gears and a second planet carrier. The second planet carrier is used for mounting the second planet gears. The transmission assembly is capable of being switched to a first state and a second state such that the transmission assembly outputs a first gear ratio or a second gear ratio separately, where the first gear ratio is greater than the second gear ratio. The motor includes a motor shaft that rotates around the first axis. The transmission assembly includes a sun gear fixedly connected to the motor shaft. A first planet gear of the first planet gears includes an external engagement portion and an internal engagement portion. The external engagement portion forms external engagement with the sun gear. The internal engagement portion is fixed connected to the external engagement portion. A length of the gearbox in an axial direction of the first axis is configured to be greater than or equal to 38 mm and less than or equal to 46 mm.

In one example, a first-stage internal ring gear forms internal engagement with the internal engagement portion, where a projection of the first-stage internal ring gear in a radial direction of the first axis at least partially overlaps with a projection of the internal engagement portion in the radial direction of the first axis.

In one example, the external engagement portion includes an external engagement post, the internal engagement portion includes an internal engagement post, and on any plane perpendicular to the first axis, a cross-sectional area of the external engagement post is greater than a cross-sectional area of the internal engagement post.

In one example, the transmission assembly includes a second-stage internal ring gear engaged with the second planet gear and including a plurality of bumps; and a lock including locking teeth that mate with the plurality of bumps, where the lock is capable of moving to at least a first position and a second position, where when the lock is at the first position, the locking teeth and the plurality of bumps are staggered in a circumferential direction of the first axis; and when the lock is at the second position, the locking teeth and the plurality of bumps are disengaged in the circumferential direction of the first axis.

In one example, the transmission assembly includes a second-stage internal ring gear including a first state and a second state, where when the second-stage internal ring gear is in the first state, the second-stage internal ring gear is engaged with the second planet gears, and when the second-stage internal ring gear is in the second state, the second-stage internal ring gear is engaged with the second planet gears and the first planet carrier at the same time; and a lock including locking teeth that mate with the second-stage internal ring gear and cause the second-stage internal ring gear to stop rotating when the second-stage internal ring gear is in the first state.

In one example, the second planet carrier is formed with an output portion connected to the output shaft.

In one example, a gear ratio outputted by the first planetary gearset is greater than or equal to 10 and less than or equal to 18.

In one example, when the transmission assembly outputs the first gear ratio, a rotational speed of the output shaft is greater than or equal to 300 r/min and less than or equal to 800 r/min.

In one example, a torque output tool includes an output shaft, a motor, a transmission assembly, and a gearbox. The output shaft is used for outputting torque. The motor is used for driving the output shaft to rotate around a first axis. The transmission assembly is used for transmitting output of the motor to the output shaft. The gearbox is used for accommodating the transmission assembly. The transmission assembly includes a first planetary gearset and a second planetary gearset. The first planetary gearset includes first planet gears and a first planet carrier. The first planet gears are driven by the motor, and the first planet carrier is used for mounting the first planet gears. The second planetary gearset includes second planet gears and a second planet carrier. The second planet carrier is used for mounting the second planet gears. The transmission assembly is capable of being switched to a first state and a second state such that the transmission assembly outputs a first gear ratio or a second gear ratio separately, where the first gear ratio is greater than the second gear ratio. When the transmission assembly outputs the first gear ratio, a rotational speed of the output shaft is greater than or equal to 300 r/min and less than or equal to 800 r/min. A length of the gearbox in an axial direction of the first axis is configured to be greater than or equal to 38 mm and less than or equal to 46 mm.

In one example, the motor includes a motor shaft that rotates around the first axis; the transmission assembly includes a sun gear fixedly connected to the motor shaft; a first planet gear of the first planet gears includes an external engagement portion that forms external engagement with the sun gear and an internal engagement portion fixedly connected to the external engagement portion.

In one example, the transmission assembly includes a first-stage internal ring gear that forms internal engagement with the internal engagement portion, where a projection of the first-stage internal ring gear in a radial direction of the first axis at least partially overlaps with a projection of the internal engagement portion in the radial direction of the first axis.

In one example, the external engagement portion includes an external engagement post, the internal engagement portion includes an internal engagement post, and on any plane perpendicular to the first axis, a cross-sectional area of the external engagement post is greater than a cross-sectional area of the internal engagement post.

In one example, the transmission assembly includes a second-stage internal ring gear engaged with the second planet gear and including a plurality of bumps; and a lock including locking teeth that mate with the plurality of bumps, where the lock is capable of moving to at least a first position and a second position, where when the lock is at the first position, the locking teeth and the plurality of bumps are staggered in a circumferential direction of the first axis; and when the lock is at the second position, the locking teeth and the plurality of bumps are disengaged in the circumferential direction of the first axis.

In one example, the transmission assembly includes a second-stage internal ring gear including a first state and a second state, where when the second-stage internal ring gear is in the first state, the second-stage internal ring gear is engaged with the second planet gears, and when the second-stage internal ring gear is in the second state, the second-stage internal ring gear is engaged with the second planet gears and the first planet carrier at the same time; and a lock including locking teeth that mate with the second-stage internal ring gear and cause the second-stage internal ring gear to stop rotating when the second-stage internal ring gear is in the first state.

In one example, the second planet carrier is formed with an output portion connected to the output shaft.

In one example, a gear ratio outputted by the first planetary gearset is greater than or equal to 10 and less than or equal to 18.

In one example, the motor includes a motor shaft that rotates around the first axis and a sun gear fixedly connected to the motor shaft; where the first planet gears are engaged with the sun gear; and the second planetary gearset includes external engagement portions that form external engagement with the first planet carrier and internal engagement portions fixedly connected to the external engagement portions.

In one example, the transmission assembly includes a second-stage internal ring gear that forms internal engagement with the internal engagement portions, where the second-stage internal ring gear at least partially overlaps with the internal engagement portions in a radial direction of the first axis.

In one example, a torque output tool further includes a torque adjustment ring sleeved on a front end of the gearbox and capable of moving forward and backward on the gearbox; an elastic member support connected to the torque adjustment ring; and an elastic member disposed on the elastic member support; where the elastic member support is at least partially sleeved on the torque adjustment ring such that the elastic member support at least partially overlaps with the torque adjustment ring in a radial direction of the first axis.

DETAILED DESCRIPTION

Figure 1:
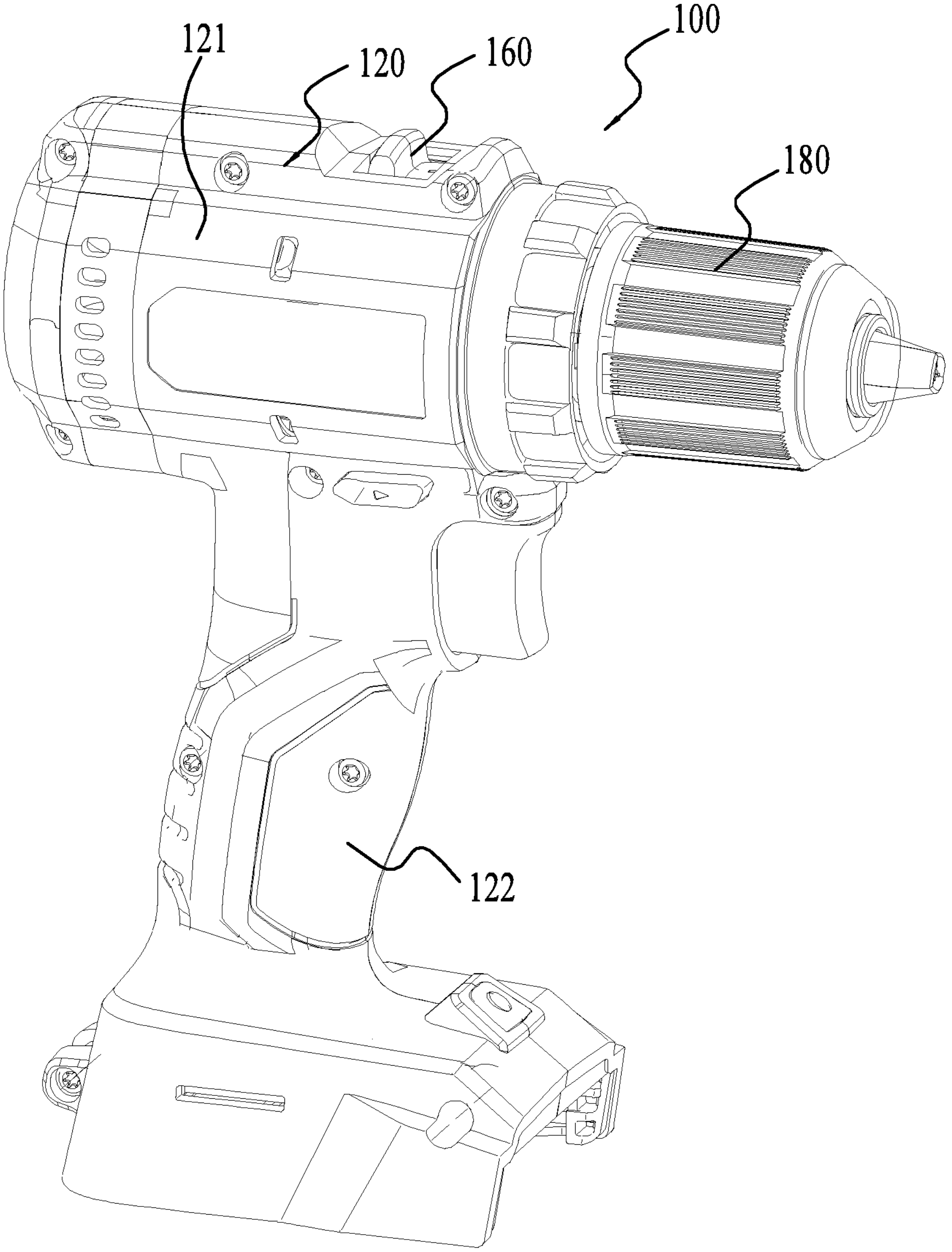
FIG. 1 is a perspective view of a torque output tool according to a first example of the present application.
Figure 2:
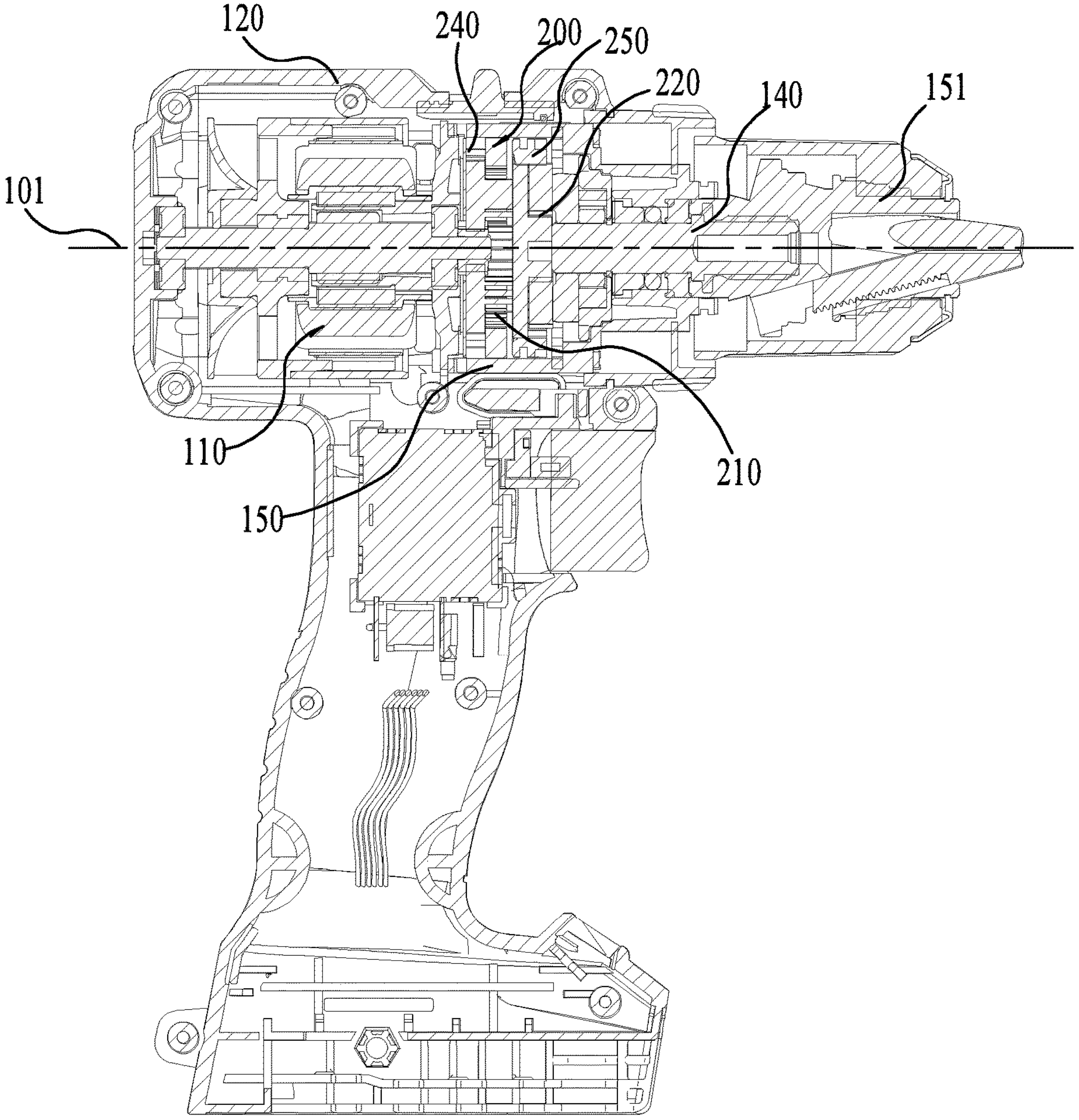
FIG. 2 is a sectional view of the torque output tool in FIG. 1 when a transmission assembly is in a first state.

Referring to FIGS. 1 and 2, as an example of a power tool, a torque output tool 100 is used for outputting torque and includes a motor 110, a housing 120, a transmission assembly 200, and an output shaft 140. The housing 120 accommodates the motor 110 and the transmission assembly 200 and supports the output shaft 140. The motor 110 is used for driving the output shaft 140 to rotate around a first axis 101, and the transmission assembly 200 connects the motor 110 to the output shaft 140 to transmit output of the motor 110 to the output shaft 140. The transmission assembly 200 has multiple states in which the output shaft 140 outputs different power and rotational speeds. A transmission state of the transmission assembly 200 is switched so that a torque magnitude and a rotational speed outputted by the output shaft 140 can be switched, thereby satisfying different operation requirements of a user.

The torque output tool 100 may be a tool such as an electric drill, an impact drill, and a screwdriver. In this example, an electric drill is used as an example. The torque output tool 100 further includes a collet device 151 for clamping a tool accessory such as a drill bit, where the collet device 151 is connected to the output shaft 140 to drive the tool accessory to perform output.

The housing 120 includes a head housing 121 and a grip 122, and the motor 110 and the transmission assembly 200 are disposed in the head housing 121. The grip 122 is connected to the head housing 121 and used for the user to hold. Optionally, the head housing 121 and the grip 122 are connected in an L shape or a T shape to be convenient for the user to hold and operate. The torque output tool 100 further includes a power supply device, where the power supply device may be a battery pack or a mains connector and is configured to be connected to the housing 120. The torque output tool 100 further includes a gearbox 150 for accommodating the transmission assembly 200, where the gearbox 150 is disposed in the housing 120 and connected to or integrally formed with the head housing 121.

Figure 3:
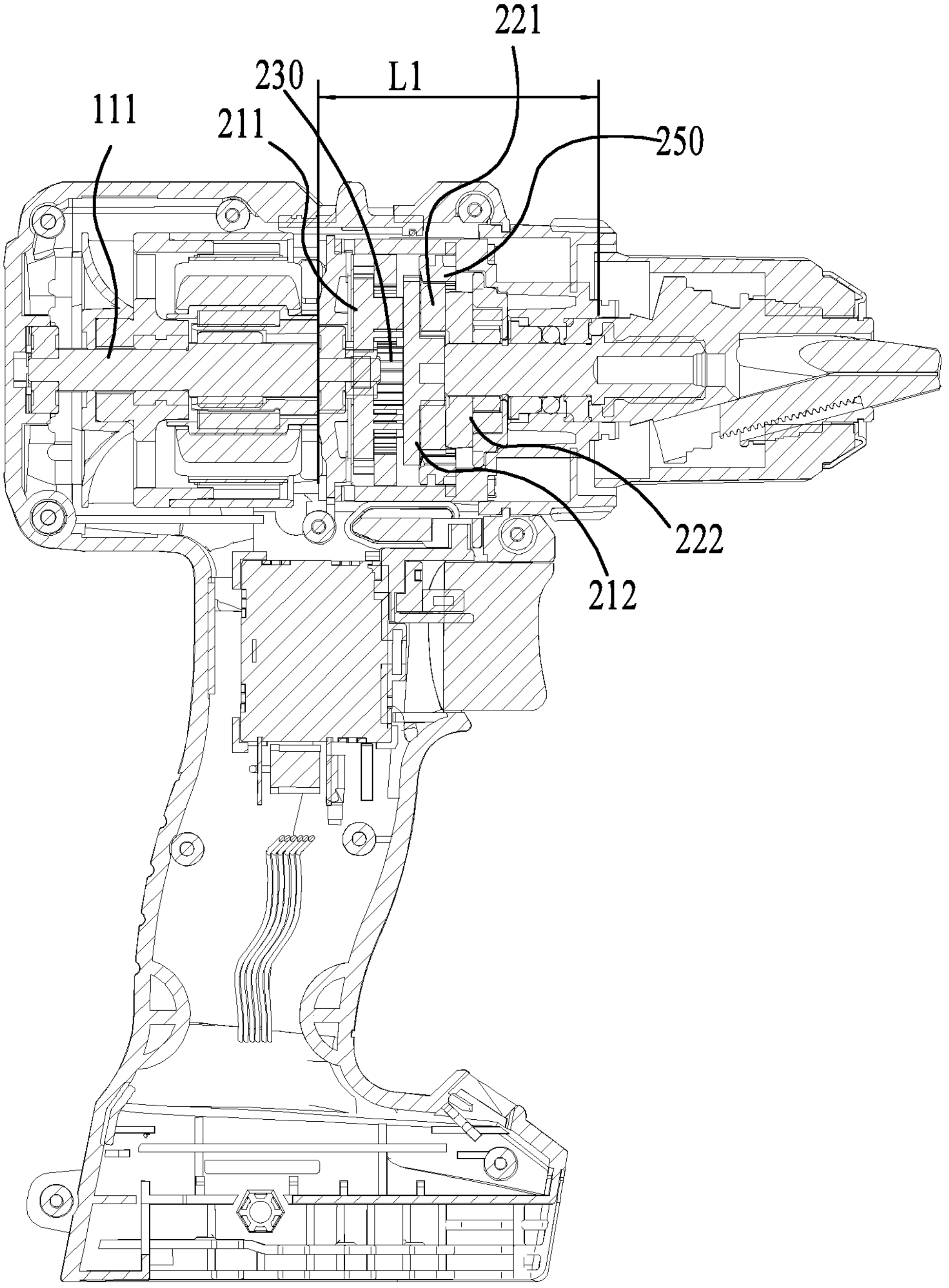
FIG. 3 is a sectional view of the torque output tool in FIG. 1 when a transmission assembly is in a second state.
Figure 4:
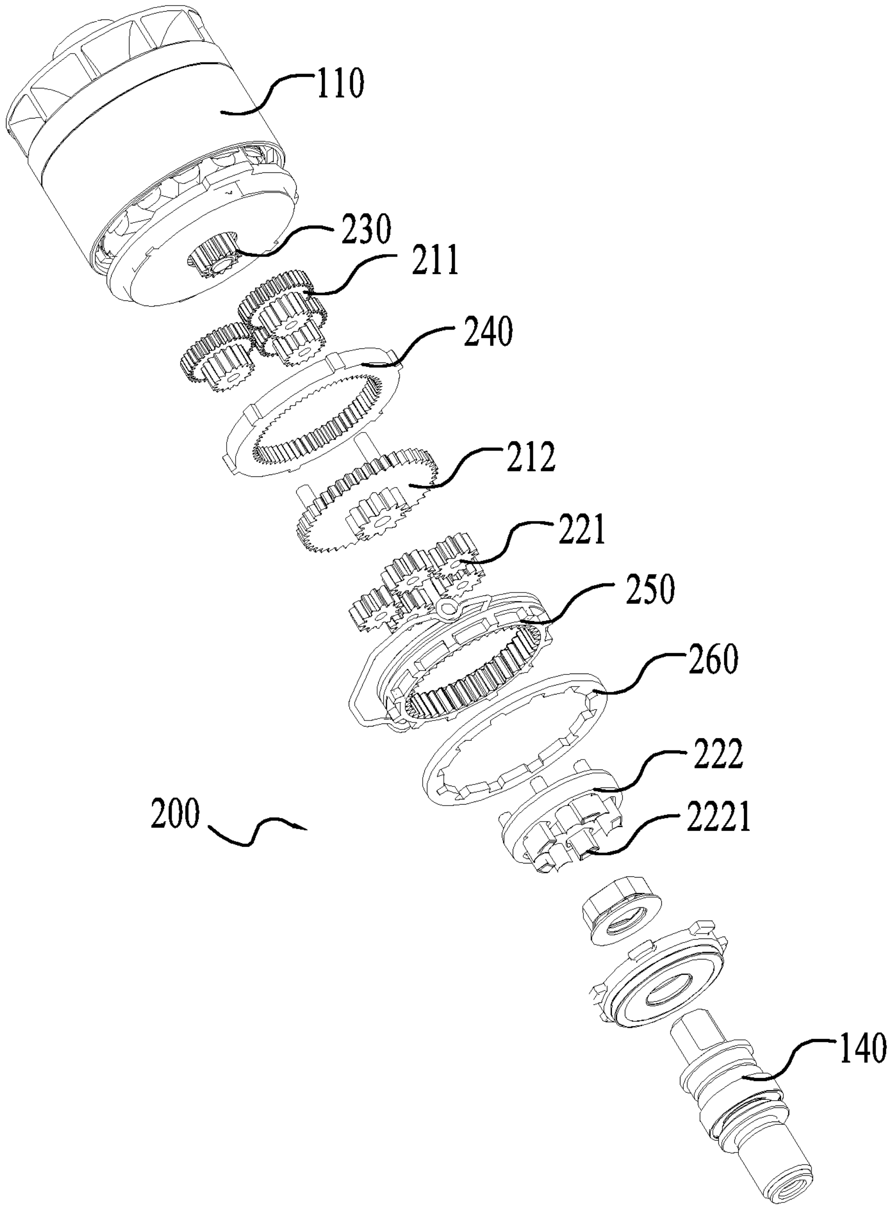
FIG. 4 is an exploded view of some parts of the torque output tool in FIG. 1.

Referring to FIGS. 2 to 4, the transmission assembly 200 is a double-layer planetary gearset and includes a first planetary gearset 210 and a second planetary gearset 220, where the first planetary gearset 210 includes first planet gears 211 and a first planet carrier 212, and the first planet gears 211 are driven by the motor 110. The first planet carrier 212 is used for mounting the first planet gears 211. After the first planet gears 211 are mounted on the first planet carrier 212, the first planet gears 211 can rotate relative to the first planet carrier 212. The second planetary gearset 220 includes second planet gears 221 and a second planet carrier 222. The second planet carrier 222 is used for mounting the second planet gears 221. After the second planet gears 221 are mounted on the second planet carrier 222, the second planet gears 221 can rotate relative to the second planet carrier 222. The transmission assembly 200 decreases the rotational speed of the output shaft 140 through the first planetary gearset 210 and the second planetary gearset 220.

The motor 110 includes a motor shaft 111 rotatable relative to the housing 120 around the first axis 101, and the transmission assembly 200 includes a sun gear 230, where the sun gear 230 is fixedly connected to the motor shaft 111 such that the sun gear 230 and the motor shaft 111 rotate synchronously. The first planetary gearset 210 is disposed closer to the motor shaft 111 than the output shaft 140, multiple first planet gears 211 are provided and configured to be engaged with the sun gear 230, and the motor 110 drives, through the sun gear 230, the first planet gears 211 to rotate. The sun gear 230 and the first planet gears 211 form engagement teeth that transmit power. A diameter of an addendum circle of the sun gear 230 is configured to be less than a diameter of an addendum circle of the first planet gear 211 so that the number of engagement teeth of the first planet gear 211 is greater than the number of engagement teeth of the sun gear 230.

The transmission assembly 200 can be switched to a first state and a second state such that the transmission assembly 200 outputs a first gear ratio or a second gear ratio separately, where the first gear ratio is greater than the second gear ratio. In this manner, when the transmission assembly 200 is in the first state or the second state, the output shaft 140 is switched to a low-speed rotation mode or a high-speed rotation mode correspondingly to provide different output states.

The transmission assembly 200 includes a first-stage internal ring gear 240 that forms a front ring gear of the transmission assembly, and internal teeth are formed on an inner circumference of the first-stage internal ring gear 240. The internal teeth of the first-stage internal ring gear 240 form engagement with the engagement teeth of the first planet gear 211. The first-stage internal ring gear 240 is fixed by the gearbox 150 and cannot rotate relative to the gearbox 150.

Figure 5:
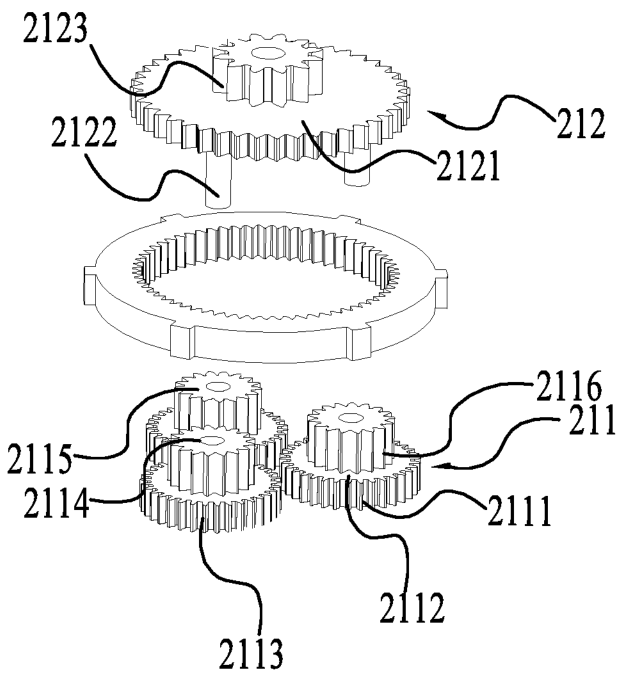
FIG. 5 is an exploded view of a first planetary gearset and a first-stage internal ring gear of the torque output tool in FIG. 1.

Referring to FIG. 5, the first planet gear 211 includes an external engagement portion 2111 and an internal engagement portion 2114, where the external engagement portion 2111 includes an external engagement post 2112 and external engagement teeth 2113 formed in a circumferential direction of the external engagement post 2112, the first planet gear 211 forms external engagement with the sun gear 230 through the external engagement teeth 2113, the internal engagement portion 2114 includes an internal engagement post 2115 and internal engagement teeth 2116 formed in a circumferential direction of the internal engagement post 2115, the first planet gear 211 forms internal engagement with the first-stage internal ring gear 240 through the internal engagement teeth 2116, and a projection of the first-stage internal ring gear 240 in a radial direction of the first axis 101 at least partially overlaps with a projection of the internal engagement portion 2114 in the radial direction of the first axis 101. The external engagement portion 2111 and the internal engagement portion 2114 are fixedly connected. Optionally, the external engagement post 2112 and the internal engagement post 2115 are integrally formed. The external engagement post 2112 is closer to the motor 110 than the internal engagement post 2115, and the external engagement post 2112 and the internal engagement post 2115 are arranged concentrically, that is, axes of the external engagement post 2112 and the internal engagement post 2115 are disposed on the same straight line. On each plane perpendicular to the first axis 101, a cross-sectional area of the external engagement post 2112 is greater than a cross-sectional area of the internal engagement post 2115.

The first planet carrier 212 includes a transmission plate 2121, support brackets 2122, and a first output portion 2123. The support brackets 2122 and the first output portion 2123 are formed on two sides of the transmission plate 2121 separately, and the support brackets 2122 are inserted into internal engagement portions 2114 and rotatably connected to the first planet gears 211 so that the internal engagement portions 2114 can drive the first planet carrier 212 to rotate around the first axis 101 during operation. Engagement teeth are formed on circumferential sides of both the transmission plate 2121 and the first output portion 2123, and the first output portion 2123 is used for being engaged with the second planetary gearset 220, thereby achieving the transmission connection between the first planetary gearset 210 and the second planetary gearset 220.

When the motor 110 is started, the motor 110 transmits power to the sun gear 230, and the sun gear 230 transmits the power to the external engagement portion 2111 of the first planet gear 211. Since the external engagement portion 2111 and the internal engagement portion 2114 are fixedly connected, the external engagement portion 2111 and the internal engagement portion 2114 rotate synchronously. The internal engagement portion 2114 and the first-stage internal ring gear 240 form internal engagement. Since the first-stage internal ring gear 240 is fixed to the gearbox 150, the internal engagement portions 2114 rotate around the first axis 101 to drive the first planet carrier 212 to rotate, thereby transmitting the power to the first planet carrier 212. The projection of the first-stage internal ring gear 240 in the radial direction of the first axis 101 at least partially overlaps with the projection of the internal engagement portion 2114 in the radial direction of the first axis 101 and does not interfere with a projection of the external engagement portion 2111 in the radial direction of the first axis 101. In this manner, on the premise of the same diameter of the gearbox 150, a diameter of an addendum circle of the external engagement portion 2111 can be increased accordingly, and the number of the external engagement teeth 2113 can be increased, thereby effectively increasing a gear ratio that can be provided by the first planetary gearset 210. A diameter of an addendum circle of the internal engagement portion 2114 is less than the diameter of the addendum circle of the external engagement portion 2111 so that an inner diameter of the first-stage internal ring gear 240 can be correspondingly reduced, thereby increasing the gear ratio that can be outputted by the first planetary gearset 210. Therefore, the torque output tool 100 provided in this example is not only reduced in dimension compared with a gearbox of a traditional three-layer planetary gearset but also reduced in dimension compared with a gearbox of a traditional double-layer planetary gearset so that the dimension of the whole machine is effectively reduced and the torque output tool 100 is portable. On the premise that only the double-layer planetary gearset is provided as a traditional structure, the transmission assembly 200 can provide a relatively high gear ratio and ensure the strength of gears and internal ring gears. The first planetary gearset 210 may provide a gear ratio greater than or equal to 10 and less than or equal to 18, and a dimension L1 of the gearbox 150 along an axial direction of the first axis 101 may be reduced to be greater than or equal to 38 mm and less than or equal to 46 mm. In this manner, while the dimension of the torque output tool 100 is greatly reduced, a relatively high gear ratio is provided, thereby ensuring the performance and service life of the torque output tool 100.

Figure 6:
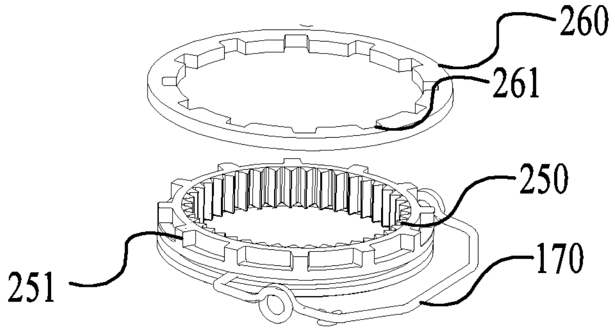
FIG. 6 is a structural view of a lock and a second-stage internal ring gear of the torque output tool in FIG. 1.

Referring to FIGS. 4 and 6, multiple second planet gears 221 are provided and form external engagement with the first output portion 2123, that is, the first output portion 2123 of the first planetary gearset 210 forms the sun gear of the second planet gears 221. The transmission assembly 200 further includes a second-stage internal ring gear 250, and internal teeth are formed on an inner circumference of the second-stage internal ring gear 250. The second-stage internal ring gear 250 and the second planet gears 221 are engaged. The second planet gears 221 are rotatably connected to the second planet carrier 222. The second planet carrier 222 is formed with a second output portion 2221 connected to the output shaft 140. The output shaft 140 includes flat portions that mate with the second output portion 2221. Part of the output shaft 140 is interposed into the second output portion 2221, thereby achieving the synchronous rotation of the output shaft 140 and the second output portion 2221.

Referring to FIGS. 2 and 3, the second-stage internal ring gear 250 includes a first state and a second state. When the second-stage internal ring gear 250 is in the first state, the second-stage internal ring gear 250 is engaged with the second planet gears 221. When the second-stage internal ring gear 250 is in the second state, the second-stage internal ring gear 250 is engaged with the second planet gears 221 and the first planet carrier 212 at the same time. The transmission assembly further includes a lock 260 for causing the second-stage internal ring gear 250 to stop rotating when the second-stage internal ring gear 250 is in the first state.

The torque output tool 100 further includes a toggle switch 160 and a link 170. The toggle switch 160 is disposed on the housing 120 and used for switching the first state or the second state of the second-stage internal ring gear 250. The link 170 penetrates through the gearbox 150 and connects the toggle switch 160 to the second-stage internal ring gear 250. The link 170 may be a metal lead screw or may be a connecting structure extending from the second-stage internal ring gear 250. The second-stage internal ring gear 250 may be pushed along the axial direction of the first axis 101 through the toggle switch 160 so that when the second-stage internal ring gear 250 is in the first state, the second-stage internal ring gear 250 is engaged with the second planet gears 221, and when the second-stage internal ring gear 250 is in the second state, the second-stage internal ring gear 250 is engaged with the second planet gears 221 and the first planet carrier 212 at the same time. The second-stage internal ring gear 250 includes multiple bumps 251, and the lock 260 includes locking teeth 261 that mate with the bumps 251. When the second-stage internal ring gear 250 is pushed into the first state, the locking teeth 261 and the bumps 251 are staggered in a circumferential direction of the first axis 101. At this time, the locking teeth 261 abut against the bumps 251 so as to limit the rotation of the second-stage internal ring gear 250, that is, the second-stage internal ring gear 250 in the first state cannot rotate relative to the gearbox 150 around the first axis 101.

When the second-stage internal ring gear 250 is in the first state, the second-stage internal ring gear 250 is engaged with only the second planet gears 221, and the second-stage internal ring gear 250 cannot rotate relative to the gearbox 150. In this case, the second planetary gearset 220 performs deceleration, and the transmission assembly 200 outputs the first gear ratio. When the second-stage internal ring gear 250 is in the second state, the second-stage internal ring gear 250 is engaged with the second planet gears 221 and the first planet carrier at the same time. At this time, the second-stage internal ring gear 250 is disengaged from the lock 260, and the second-stage internal ring gear 250, the first planet carrier 212 and the second planet gears 221 rotate at the same speed for output. In this case, the second planetary gearset 220 does not perform deceleration, and the transmission assembly 200 outputs the second gear ratio. Therefore, the second gear ratio is less than the first gear ratio. When the transmission assembly 200 is in the first state, the output shaft 140 rotates at a low speed and outputs relatively large torque. When the transmission assembly 200 is in the second state, the output shaft 140 rotates at a relatively high speed and outputs relatively small torque. Through the preceding principles, the transmission assembly 200 can output the first gear ratio or the second gear ratio separately through the toggle switch 160, so as to switch the rotational speed of the output shaft 140.

The lock 260 may be an annular body fixedly connected to the gearbox 150 or the housing 120, and the locking teeth 261 are formed on the annular body and used for limiting the second-stage internal ring gear 250. Optionally, the lock 260 may be integrally formed with the gearbox 150 or the housing 120, and the lock 260 extending from the housing 120 or the gearbox 150 is used for limiting the second-stage internal ring gear 250.

Figure 7:
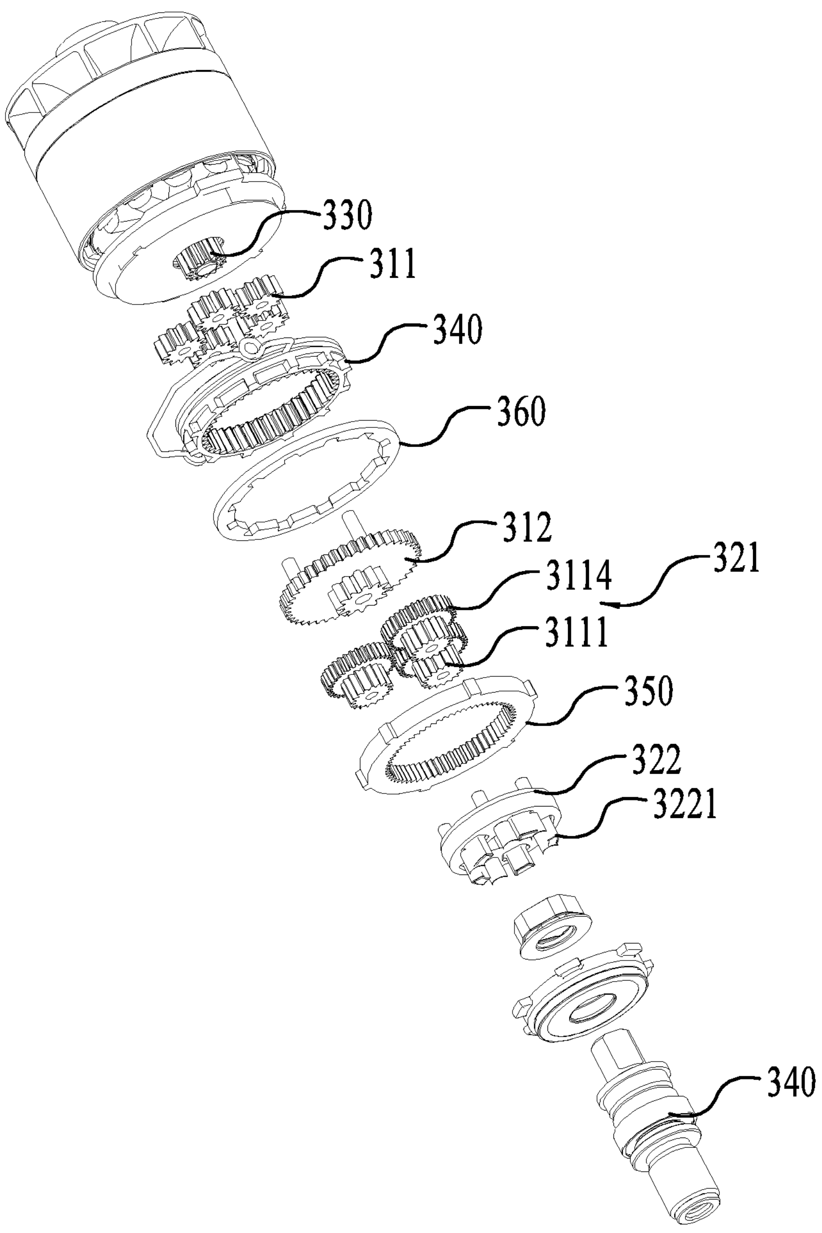
FIG. 7 is an exploded view of some parts of a torque output tool according to an example of the present application.

Referring to FIG. 7, in an example, first planet gears 311 are engaged with a sun gear 330, a second planet gear 321 includes an internal engagement portion 3111 and an external engagement portion 3114, and the external engagement portion 3114 forms external engagement with a first planet carrier 312. The external engagement portion 3114 and the internal engagement portion 3111 are fixedly connected. A second-stage internal ring gear 350 forms internal engagement with the internal engagement portion 3111, and the second-stage internal ring gear 350 at least partially overlaps with the internal engagement portion 3111 in a radial direction of a first axis 301. The second-stage internal ring gear

350 is fixed to a gearbox 350 and cannot rotate relative to the gearbox 350. The second-stage internal ring gear 350 and second planet gears 321 are engaged. The second planet gears 321 are rotatably connected to a second planet carrier 322. The second planet carrier 322 is formed with a second output portion 3221 connected to an output shaft 340. The output shaft 340 includes flat portions that mate with the second output portion 3221. Part of the output shaft 340 is interposed into the second output portion 3221, thereby achieving the synchronous rotation of the output shaft 340 and the second output portion 3221.

A first-stage internal ring gear 340 includes a first state and a second state. When the first-stage internal ring gear 340 is in the first state, the first-stage internal ring gear 340 is engaged with the first planet gears 311. When the first-stage internal ring gear 340 is in the second state, the first-stage internal ring gear 340 is engaged with the first planet gears 311 and the first planet carrier 312 at the same time. A lock 360 is used to cause the first-stage internal ring gear 340 to stop rotating when the first-stage internal ring gear 340 is in the first state.

Figure 8:
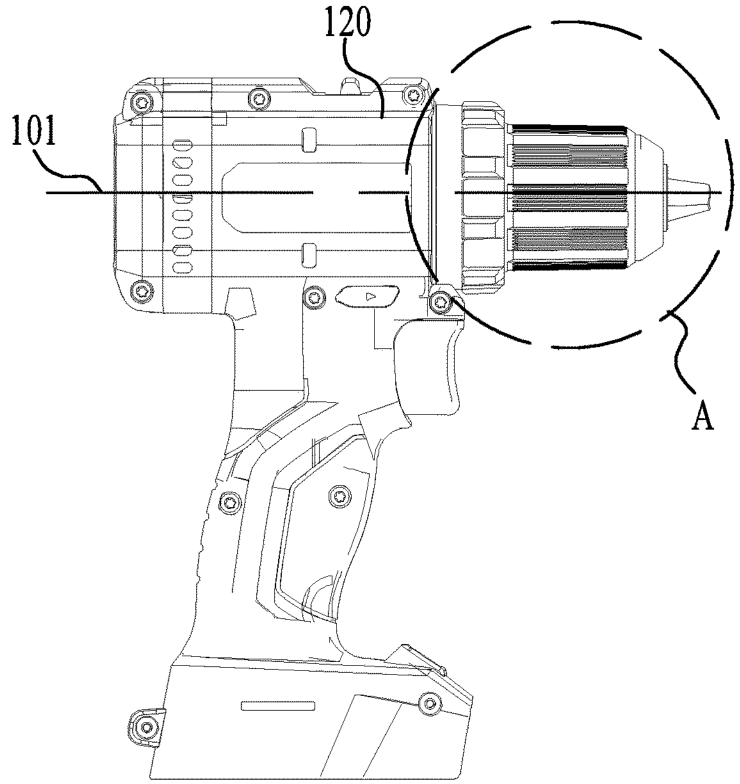
FIG. 8 is a plan view of a torque output tool according to an example of the present application.
Figure 9:
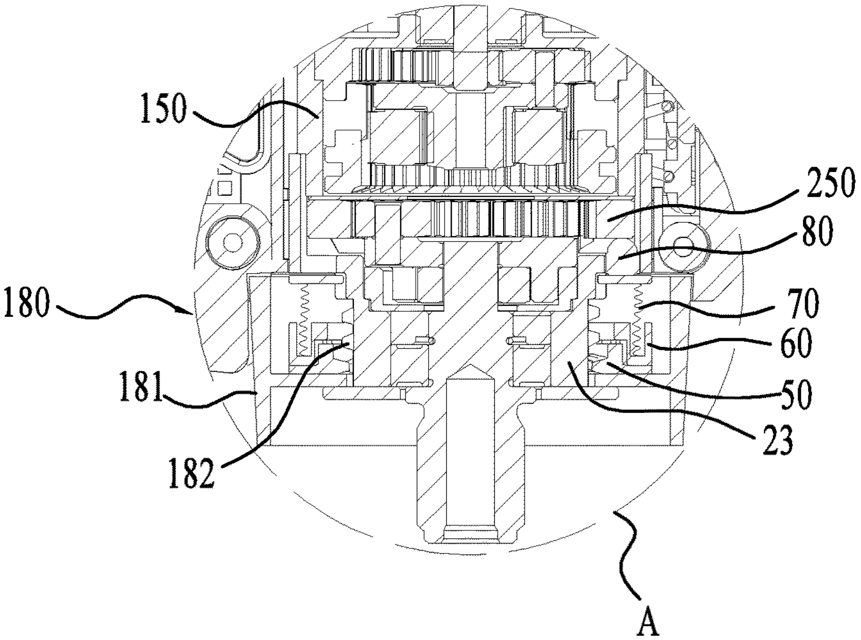
FIG. 9 is a sectional view of part A of the torque output tool in FIG. 8.
Figure 10:
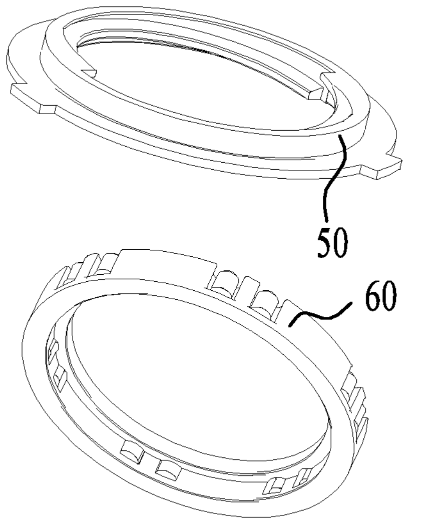
FIG. 10 is a structural view of a torque adjustment ring and an elastic member support of the torque output tool in FIG. 8.

Referring to FIGS. 8 to 10, the torque output tool 100 further includes a torque adjustment assembly 180 that includes a torque adjustment ring 50 sleeved on a front end of the gearbox 150, for example, sleeved on the front of the gearbox 150. The torque adjustment ring 50 can move forward and backward on the gearbox 150. The torque adjustment ring 50 is moved so as to press against or loosen the second-stage internal ring gear 250 in the gearbox 150, thereby achieving torque adjustment.

An external thread 182 is provided at the front end of the gearbox 150, the external thread 182 is provided on a front housing 23 of the gearbox 150, and an internal thread adapted to the external thread 182 is provided on an inner wall of the torque adjustment ring 50. The internal thread mates with the external thread 182 so that the torque adjustment ring 50 is connected to the gearbox 150. When the torque adjustment ring 50 is rotated, the torque adjustment ring 50 can move forward and backward on the gearbox 150 through threads, thereby achieving the torque adjustment of the torque output tool 100.

The torque adjustment assembly 180 further includes an elastic member support 60 that is connected to the torque adjustment ring 50 and can move together with the torque adjustment ring 50. An elastic member 70 is disposed on the elastic member support 60 and connected to a shift pin 80, and the shift pin 80 abuts against the second-stage internal ring gear 250 to press against or loosen the second-stage internal ring gear 250. As shown in FIG. 8, the shift pin 80 penetrates through the front housing 23 of the gearbox 150, a rear end of the shift pin 20 abuts against a front end of the second-stage internal ring gear 250 so as to press against the second-stage internal ring gear 250, a front end of the shift pin 20 abuts against the elastic member 70, the elastic member 70 is disposed on the elastic member support 60, and the elastic member support 60 is connected to the torque adjustment ring 50. When the torque adjustment ring 50 moves forward and backward along the gearbox 150 under an external force, the torque adjustment ring 50 drives the elastic member support 60 to move forward and backward, so as to press against or loosen the elastic member 70. The elastic member 70 further presses against or loosens the shift pin 80, thereby switching a pressing force applied by the shift pin 80 to the second-stage internal ring gear 250.

The elastic member support 60 is at least partially sleeved on the torque adjustment ring 50, that is, a segment of the elastic member support 60 is overlaid on the torque adjustment ring 50 in the direction of the first axis 101 so that the elastic member support 60 can at least partially overlap with the torque adjustment ring 50 in the radial direction of the first axis 101. The elastic member support 60 is nested on the torque adjustment ring 50, which can reduce a dimension of the whole machine along the direction of the first axis 101. In addition, the elastic member 70 is disposed in an axial projection of the torque adjustment ring 50 in the direction of the first axis 101 so that the elastic member 70 can be prevented from occupying a relatively large space in the radial direction, and a radial dimension of the whole machine can be reduced. In this manner, the torque output tool 100 is more portable and can be applied to more operation scenarios. A dimension of the torque adjustment assembly 180 is reduced and an overall length of the torque output tool 100 is reduced so that while the performance of the torque output tool 100 is ensured, an overall dimension of the torque output tool 100 can be greatly reduced.

Figure 11:
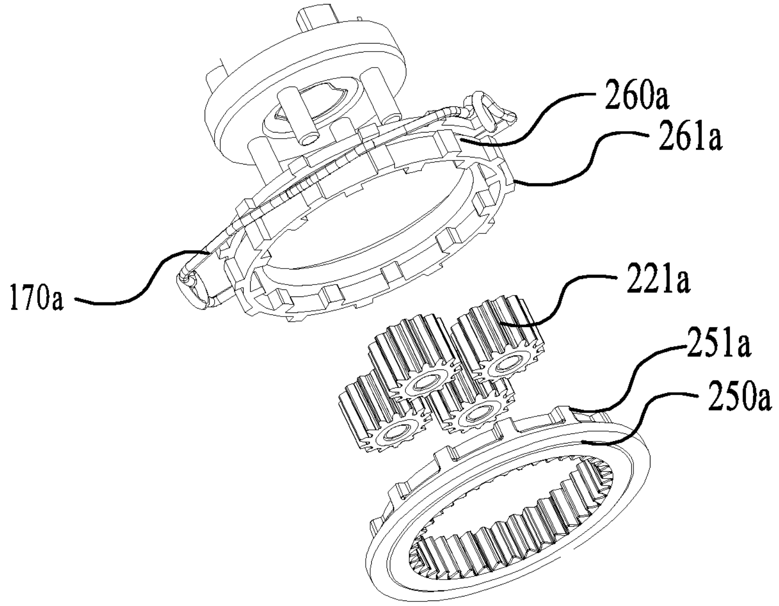
FIG. 11 is a schematic view of some parts of a transmission assembly according to an example of the present application.

Referring to FIG. 11, in another example of the present application, a second-stage internal ring gear 250*a* is engaged with second planet gears 221*a*, the second-stage internal ring gear 250*a* includes multiple bumps 251*a*, and a lock 260*a* include locking teeth 261*a* that mate with the bumps 251*a*. A link 170*a* connects the lock 260*a* to a toggle switch 160*a*, and the lock 260*a* can move to at least a first position and a second position. When the lock 260*a* is at the first position, the locking teeth 261*a* and the second-stage internal ring gear 250*a* are staggered in a circumferential direction of a first axis; and when the lock 260*a* is at the second position, the locking teeth 261*a* and the bumps 251*a* are disengaged in the circumferential direction of the first axis. When the lock 260*a* is at the first position, the locking teeth 261*a* abut against the bumps 251*a* so as to limit the rotation of the second-stage internal ring gear 250*a*, that is, the second-stage internal ring gear 250*a* cannot rotate relative to the gearbox around the first axis at this time. In this case, the second planetary gearset performs deceleration, and a transmission assembly 200*a* outputs a first gear ratio. When the lock 260*a* is moved to the second position, the locking teeth 261*a* no longer abut against the bumps 251*a* so that the second-stage internal ring gear 250*a* can rotate relative to the gearbox, the second-stage internal ring gear 250*a* and the second planet gears 221*a* rotate synchronously, and the second planetary gearset does not perform deceleration. In this case, the transmission assembly 200*a* outputs a second gear ratio as a whole, and the first gear ratio is greater than the second gear ratio.

Figure 12:
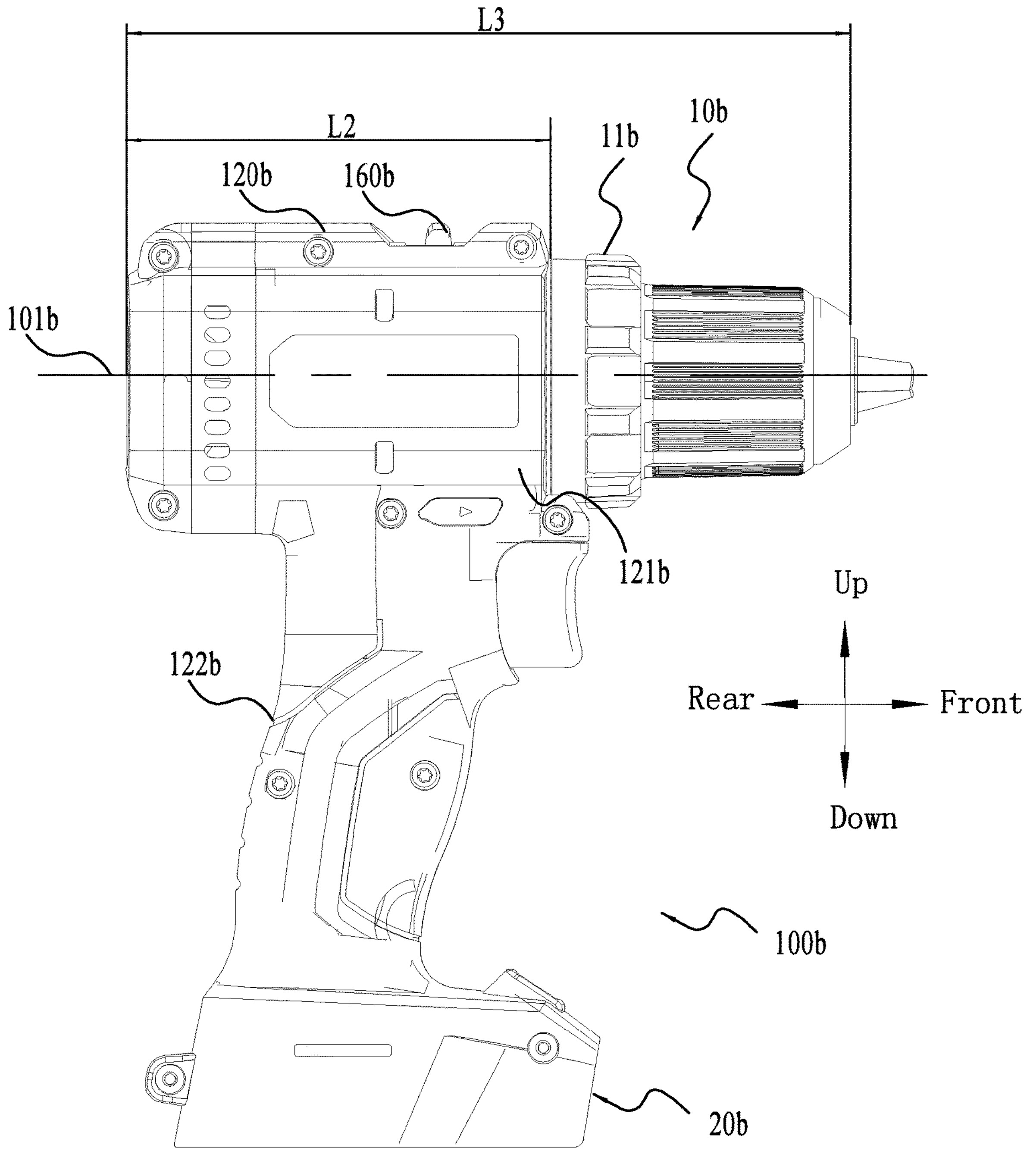
FIG. 12 is a plan view of a torque output tool according to a second example of the present application.
Figure 13:
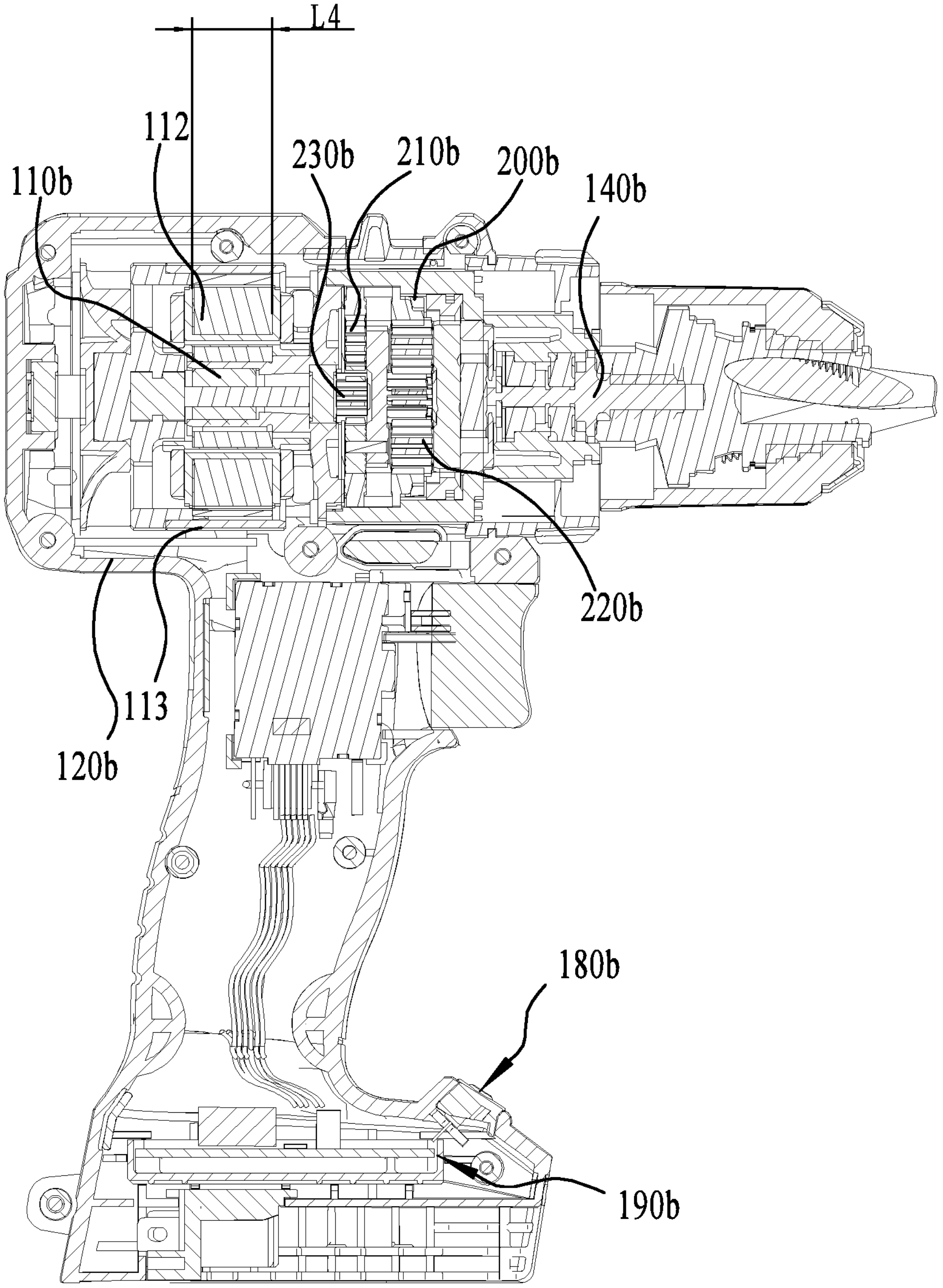
FIG. 13 is a sectional view of the torque output tool in FIG. 12 when a lock is at a first position.
Figure 14:
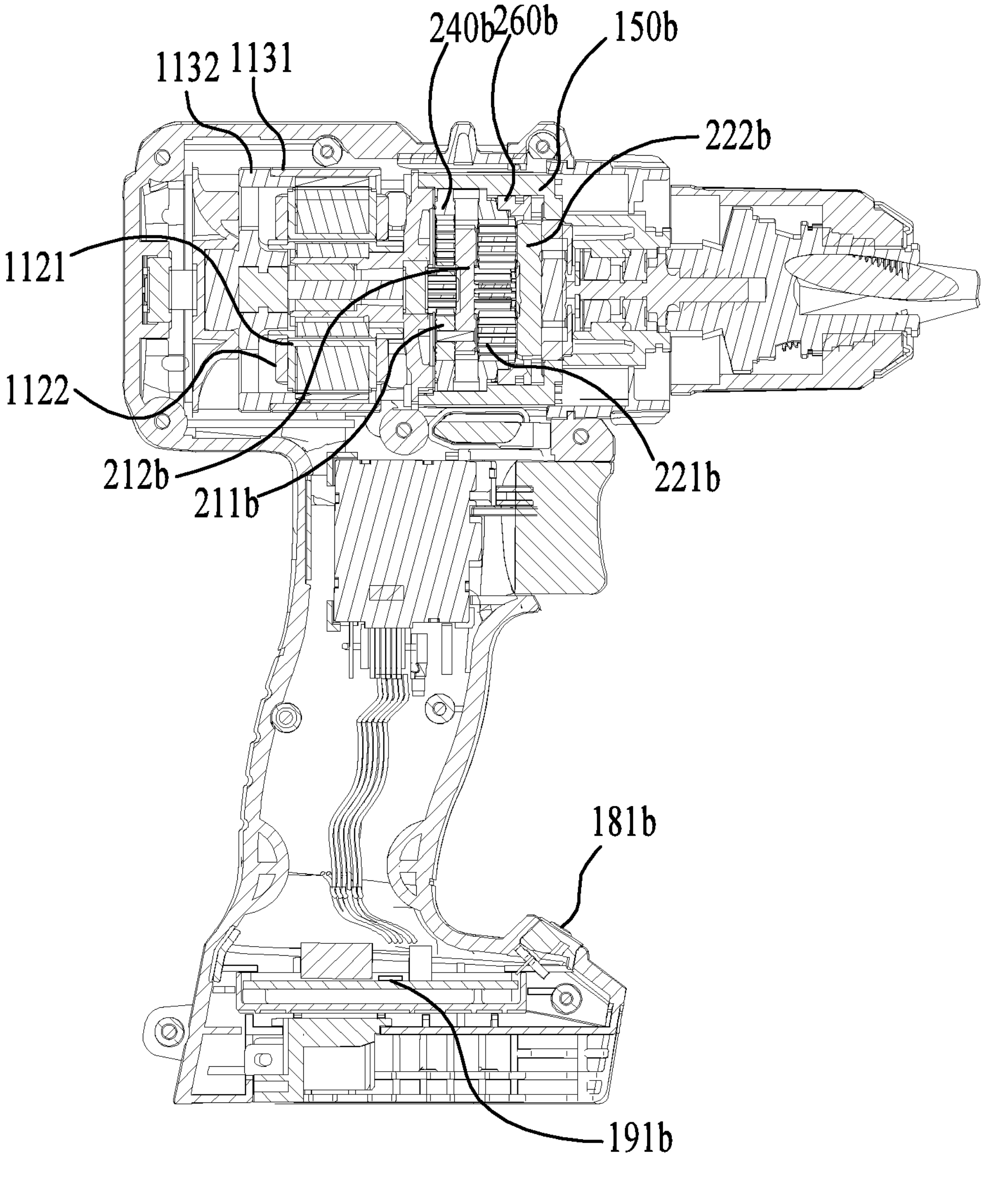
FIG. 14 is a sectional view of the torque output tool in FIG. 12 when a lock is at a second position.
Figure 15:
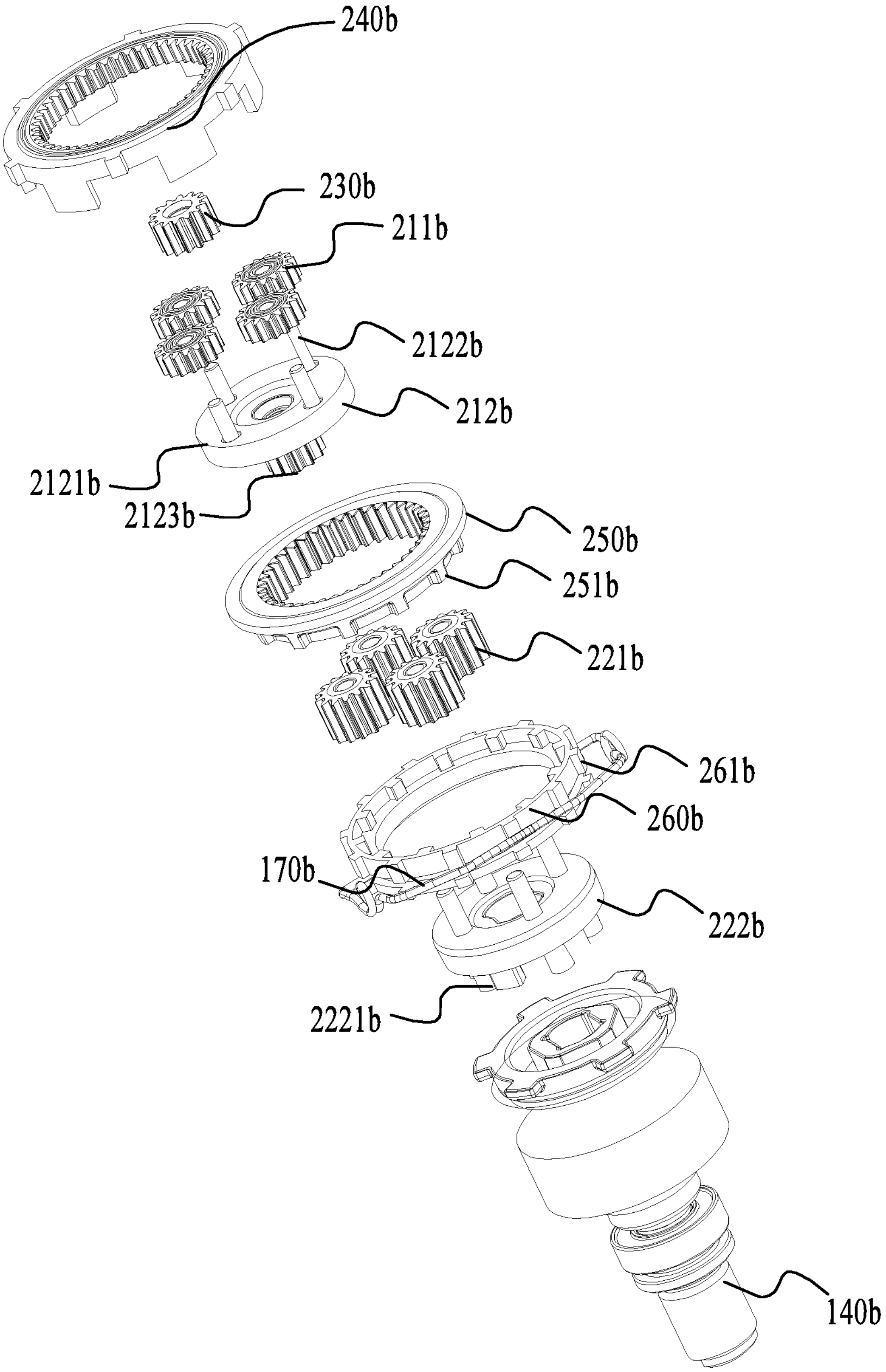
FIG. 15 is an exploded view of some parts of the torque output tool in FIG. 12.

Referring to FIGS. 12 and 13, FIGS. 12 and 13 show a torque output tool 100*b* according to a second example of the present application. In the second example of the present application, a transmission assembly 200*b* of the torque output tool 100*b* is also a double-layer planetary gearset. Referring to FIGS. 13 to 15, the transmission assembly 200*b* includes a first planetary gearset 210*b* and a second planetary gearset 220*b*, where the first planetary gearset 210*b* includes first planet gears 211*b* and a first planet carrier 212*b*, and the second planetary gearset 220*b* includes second planet gears 221*b* and a second planet carrier 222*b*. The transmission assembly 200*b* includes a sun gear 230*b*, where the sun gear 230*b* is connected to a motor 110*b* and driven to rotate by the motor 110*b*. The first planet gears 211*b* are configured to be engaged with the sun gear 230*b*.

Referring to FIGS. 13 to 15, the transmission assembly 200*b* further includes a first-stage internal ring gear 240*b* fixed in a housing 120*b* and engaged with the first planet gears 211*b*. Multiple first planet gears 211*b* are provided and configured to be engaged with the sun gear 230*b*, and the motor 110*b* drives, through the sun gear 230*b*, the first planet gears 211*b* to rotate. The sun gear 230*b* and the first planet gears 211*b* form engagement teeth that transmit power. A diameter of an addendum circle of the sun gear 230*b* is configured to be less than a diameter of an addendum circle of the first planet gear 211*b* so that the number of engagement teeth of the first planet gear 211*b* is greater than the number of engagement teeth of the sun gear 230*b*.

The first planet carrier 212*b* includes a transmission plate 2121*b*, support brackets 2122*b*, and a first output portion 2123*b*. The support brackets 2122*b* and the first output portion 2123*b* are formed on two sides of the transmission plate 2121*b* separately, and the support brackets 2122*b* are inserted into the first planet gears 211*b* and rotatably connected to the first planet gears 211*b* so that the first planet gears 211*b* can drive the first planet carrier to rotate around a first axis 101*b* during operation. Engagement teeth are formed on circumferential sides of both the transmission plate 2121*b* and the first output portion 2123*b*, and the first output portion 2123*b* is used for being engaged with the second planetary gearset 220*b*, thereby achieving the transmission connection between the first planetary gearset 210*b* and the second planetary gearset 220*b*.

Multiple second planet gears 221*b* are provided and form external engagement with the first output portion 2123*b*, that is, the first output portion 2123*b* of the first planetary gearset 210*b* forms the sun gear of the second planet gears 221*b*. The transmission assembly 200*b* further includes a second-stage internal ring gear 250*b*, and internal teeth are formed on an inner circumference of the second-stage internal ring gear 250*b*. The second-stage internal ring gear 250*b* and the second planet gears 221*b* are engaged. The second planet gears 221*b* are rotatably connected to the second planet carrier 222*b*. The second planet carrier 222*b* is formed with a second output portion 2221*b* connected to an output shaft 140*b*. The output shaft 140*b* includes flat portions that mate with the second output portion 2221*b*. Part of the output shaft 140*b* is interposed into the second output portion 2221*b*, thereby achieving the synchronous rotation of the output shaft 140*b* and the second output portion 2221*b*.

The second-stage internal ring gear 250*b* is engaged with the second planet gears 221*b*, the second-stage internal ring gear 250*b* includes multiple bumps 251*b*, and a lock 260*b* includes locking teeth 261*b* that mate with the bumps 251*b*. A link 170*b* connects the lock 260*b* to a toggle switch, and the lock 260*b* can move to at least a first position and a second position. When the lock 260*b* is at the first position, the locking teeth 261*b* and the second-stage internal ring gear 250*b* are staggered in a circumferential direction of the first axis 101*b*; and when the lock 260*b* is at the second position, the locking teeth 261*b* and the bumps 251*b* are disengaged in the circumferential direction of the first axis 101*b*. When the lock 260*b* is at the first position, the locking teeth 261*b* abut against the bumps 251*b* so as to limit the rotation of the second-stage internal ring gear 250*b*, that is, the second-stage internal ring gear 250*b* cannot rotate relative to a gearbox 150*b* around the first axis 101*b* at this time. In this case, the second planetary gearset 220*b* performs deceleration, and the transmission assembly 200*b* outputs a first gear ratio as a whole. When the lock 260*b* is moved to the second position, the locking teeth 261*b* no longer abut against the bumps 251*b* so that the second-stage internal ring gear 250*b* can rotate relative to the gearbox 150*b*, the second-stage internal ring gear 250*b* and the second planet gears 221*b* rotate synchronously, and the second planetary gearset 220*b* does not perform deceleration. In this case, the transmission assembly 200*b* outputs a second gear ratio as a whole, and the first gear ratio is greater than the second gear ratio.

The lock 260*b* may include an annular body provided with the locking teeth 261*b*. The lock 260*b* is formed with a mating portion that mates with the gearbox 150*b* so that the housing 120*b* mates with the mating portion of the lock 260*b* so as to limit the rotation of the lock 260*b* relative to the housing 120*b*, and the lock 260*b* is fixed to the gearbox 150*b* in a circumferential direction and can move to the first position and the second position relative to the gearbox 150*b*.

Optionally, the lock 260*b* is fixed by the housing 120*b* in the circumferential direction and directly formed with the mating portion that mates with the housing 120*b* so that the housing 120*b* mates with the mating portion of the lock 260*b* so as to limit the rotation of the lock 260*b* relative to the housing 120*b*, and the lock 260*b* can move to the first position or the second position relative to the housing 120*b* along an axial direction of the first axis 101*b*. The housing 120*b* is provided with a through hole for part of the lock 260*b* to penetrate through the housing 120*b* so that the user can toggle the lock 260*b* to switch the first position or the second position where the lock 260*b* is located.

In the second example, the provided transmission assembly 200*b* completes the transmission of power through the double-layer planetary gearset so that a dimension of the gearbox 150*b* can be effectively reduced, and a position of the lock 260*b* is switched so as to switch a gear ratio, which is stable and reliable and can prolong the service life of the transmission assembly 200*b*. However, a relatively high gear ratio cannot be provided only through the double-layer planetary gearset provided in this example, so it cannot be ensured that the output shaft 140*b* can output sufficient torque. To make up for an insufficient deceleration capability of planet gears in two layers, in this example, a specific motor 110*b* is provided to mate with the transmission assembly 200*b*, so as to ensure the decelerated transmission of the motor 110*b*. Thus, the torque outputted by the output shaft 140*b* can satisfy operation requirements of the torque output tool 100*b*.

The motor 110*b* includes a stator assembly 112 and a rotor assembly 113, where the stator assembly 112 includes a stator bracket 1121 and stator windings 1122, and the rotor assembly 113 includes a rotor sleeve 1131 and permanent magnets 1132. Slots for fixing the permanent magnets 1132 are formed on the rotor sleeve 1131. The permanent magnets 1132 are embedded into the slots and mounted on the rotor sleeve 1131. The stator windings 1122 are configured to be wound onto the stator bracket 1121. The rotor assembly 113 is configured to be sleeved outside the stator assembly 112 and rotatable relative to the stator assembly 112. After the motor 110*b* is energized, the rotor assembly 113 rotates relative to the stator assembly 112, and the rotor assembly 113 includes a motor shaft 111*b* connected to the rotor sleeve 1131 so that when the motor 110*b* is in operation, the motor shaft 111*b* rotates around the first axis 101*b* to drive the output shaft 140*b*.

In this example, multiple permanent magnets 1132 are provided, and the number of poles formed by the permanent magnets 1132 is configured to be not less than four pairs, so as to relatively adjust an output rotational speed of the motor 110*b*. In this example, the motor 110*b* is an outer rotor electric motor, and the output rotational speed of the motor 110*b* is configured to be greater than or equal to 6400 r/min and less than or equal to 30000 r/min. In some examples, a diameter of the motor 110*b* is 52 mm and a length of a stator lamination is 15 mm. In this example, the output rotational speed of the motor 110_b_ matches the transmission capability of the transmission assembly 200_b_ provided in this example so that while the torque output tool 100_b_ has a reasonable output rotational speed and reasonable torque, an overall length of the torque output tool 100_b_ is relatively small, thereby making the whole machine convenient to operate and prolonging its service life.

In this manner, the output rotational speed of the motor 110_b_ matches the transmission capability of the transmission assembly 200_b_ provided in this example, the torque output tool 100_b_ has the reasonable output rotational speed and torque, and a dimension of a head housing 121_b_ and the strength of the transmission assembly 200_b_ can be reduced, thereby making the whole machine convenient to operate and prolonging its service life. Optionally, the transmission assembly 200_b_ in the first example can mate with the motor in this example, thereby reducing the requirements of the transmission assembly 200_b_ for the gear ratio and reducing a dimension of the transmission assembly 200_b_.

The transmission assembly 200_b_ provided in the preceding examples completes the transmission of power through the double-layer planetary gearset so that the dimension of the gearbox 150_b_ can be effectively reduced, and a position of the lock 260 is switched so as to switch a gear ratio, which is stable and reliable and can prolong the service life of the transmission assembly 200. However, a relatively high gear ratio cannot be provided only through the double-layer planetary gearset provided in this example, so it cannot be ensured that the output shaft 140 can output sufficient torque. To make up for an insufficient deceleration capability of planet gears in two layers, in this example, the motor 110 is preferably configured to be an outer rotor electric motor, an output rotational speed of the motor 110 is configured to be greater than or equal to 6400 r/min and less than or equal to 30000 r/min, a diameter of the motor 110 is 52 mm, and a length of a stator lamination is 15 mm. In this manner, the output rotational speed of the motor 110 matches the transmission capability of the transmission assembly 200 provided in this example so that while a power tool 1 has the reasonable output rotational speed and torque, an overall length of the power tool is relatively small, thereby making the whole machine convenient to operate and prolonging its service life.

Optionally, the torque output tool 100_b_ further includes a torque adjustment device 180_b_ and a circuit board assembly 190_b_, the torque adjustment device 180_b_ includes a torque adjustment member 181_b_, and the circuit board assembly 190_b_ includes a controller 191_b_. The controller 191_b_ is connected to a power supply device and the motor 110_b_. The controller 191_b_ receives an electrical signal sent by the torque adjustment member 181 and controls output torque of the motor 110_b_ so that a mechanical torque adjustment assembly does not need to be provided at a front end of the head housing 121_b_, and the overall dimension of the torque output tool 100_b_ can be reduced. Through the preceding various examples provided in the present application, the torque output tool provided in the present application uses the double-layer planetary gearset for transmission so that the length of the head housing in the axial direction of the first axis is reduced, and the torque output tool can output a relatively low rotational speed. In this manner, while the performance of the torque output tool is ensured, the overall dimension of the torque output tool is reduced. As shown in FIG. 12, through the preceding examples of the present application, a dimension L2 of the head housing (excluding the torque adjustment assembly) of the torque output tool in the axial direction of the first axis can be greater than or equal to 80 mm and less than or equal to 120 mm.

Figure 16:
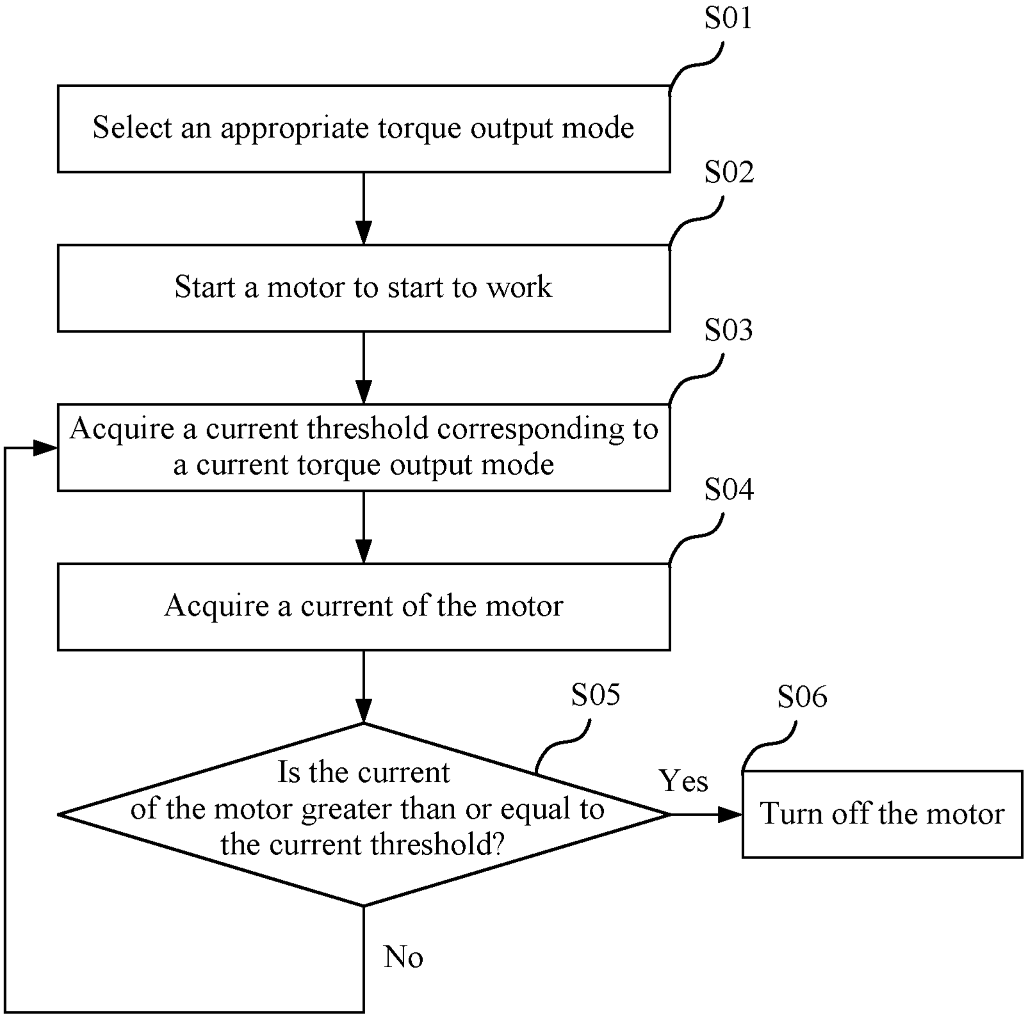
FIG. 16 is a flowchart of a control method for a torque adjustment device.

Referring to FIGS. 12 to 14, the torque adjustment device 180_b_ is disposed at an end of a grip 122_b_ closer to a power supply device. The circuit board assembly 190_b_ further includes the controller 191_b_ disposed on the circuit board assembly 190_b_. The controller 191_b_ is electrically connected to the torque adjustment device 180_b_ and the motor 110_b_. The controller 191_b_ is configured to acquire a current value of the motor 110_b_ in real time. The torque adjustment member 181_b_ is a knob at least partially disposed on the housing 120_b_. By toggling the knob, the user can select maximum torque that the torque output tool 100_b_ can output under a current working condition. In this example, the user may select six torque output modes through the torque adjustment device 180_b_, and of course, more modes may be set. When the user selects a torque output mode corresponding to the current working condition of the torque output tool 100_b_ through the knob, the controller acquires a current threshold corresponding to a current torque output mode through the torque 191_b_ adjustment device 180_b_ and compares the current value of the motor 110_b_ acquired in real time with a current threshold. When the current value of the motor 110_b_ is greater than or equal to the current threshold, the motor 110_b_ is turned off. Referring to FIG. 16, a method for controlling output torque of the torque output tool 100_b_ is described below.

In S01, a knob is adjusted so as to select an appropriate torque output mode.

In S02, a motor is started and the torque output tool starts to work.

In S03, a current threshold corresponding to a current torque output mode is acquired.

In S04, a real-time current value of the motor is acquired.

In S05, whether the current value of the motor is greater than or equal to the current threshold is determined. If so, step S06 is performed. If not, step S04 is performed.

In S06, the motor is turned off.

In the preceding example, the controller receives an electrical signal sent by the torque adjustment device 180_b_ and controls the maximum output torque of the motor 110_b_ so that a mechanical torque adjustment assembly does not need to be provided at the front end of the head housing 121_b_, and the overall dimension of the torque output tool 100_b_ can be reduced.

As shown in FIGS. 12 to 14, according to the preceding examples of the present application, the dimension L2 of the head housing 121_b_ of the torque output tool 100_b_ in the axial direction of the first axis 101_b_ can be greater than or equal to 80 mm and less than or equal to 120 mm. In some examples, the dimension L2 of the head housing 121_b_ of the torque output tool 100_b_ in the axial direction of the first axis 101_b_ can be greater than or equal to 95 mm and less than or equal to 110 mm. A ratio of a length L2 of the head housing 121_b_ in a front and rear direction to a length L4 of the stator lamination of the motor 110_b_ is greater than or equal to 4 and less than or equal to 7.5. In some examples, the ratio of the length L2 of the head housing 121_b_ in the front and rear direction to the length L4 of the stator lamination of the motor 110_b_ is greater than or equal to 5 and less than or equal to 6.

Referring to FIG. 12, according to the preceding examples of the present application, the torque output tool 100_b_ includes a tool body 10_b_ and a power supply device 20_b_. The tool body 10_b_ includes a body portion 11_b_ extending in the front and rear direction and used for clamping a tool accessory. A length L3 of the body portion 11_b_ in the front and rear direction is greater than or equal to 110 mm and less than or equal to 140 mm. In some examples, the length L3 of the body portion 11*b* in the front and rear direction is greater than or equal to 120 mm and less than or equal to 130 mm.

What is claimed is:

1. A torque output tool, comprising:

an output shaft for outputting torque;

a motor having a motor shaft for driving the output shaft to rotate around a first axis;

a housing for supporting the motor;

a double-layer planetary gearset transmission assembly for transmitting output of the motor to the output shaft; and a gearbox for accommodating at least a portion of the double-layer planetary gearset transmission assembly;

wherein the double-layer planetary gearset transmission assembly comprises:

a sun gear fixedly connected to the motor shaft;

a first planetary gearset comprising first planet gears, a first-stage internal ring gear, and a first planet carrier, wherein the first planet gears are driven by the motor, and the first planet gears are rotatably mounted to the first planet carrier; and a second planetary gearset comprising second planet gears, a second-stage internal ring gear, and a second planet carrier, wherein the second planet carrier is used for mounting the second planet gears;

wherein the double-layer planetary gearset transmission assembly is capable of being switched to a first state and a second state such that the double-layer planetary gearset transmission assembly outputs a first gear ratio or a second gear ratio separately, and the first gear ratio is greater than the second gear ratio;

wherein the motor comprises:

the motor shaft that rotates around the first axis;

wherein each of the first planet gears comprises:

an external engagement portion comprising external engagement teeth that engage with the sun gear and do not engage with any internal ring gear; and an internal engagement portion fixedly connected to the external engagement portion and comprising internal engagement teeth, the internal engagement teeth rotate synchronously with the external engagement teeth and engage the first-stage internal ring gear; and wherein the internal engagement teeth are disposed at a front of the external engagement teeth, a diameter of an addendum circle of the internal engagement teeth is less than a diameter of an addendum circle of the external engagement teeth, the first planetary gearset provides a gear ratio greater than or equal to 10 and less than or equal to 18, and a length of the gearbox with the double-layer planetary gearset transmission assembly in an axial direction of the first axis is greater than or equal to 38 mm and less than or equal to 46 mm.

2. The torque output tool of claim 1, wherein the first-stage internal ring gear that forms internal engagement with the internal engagement portion, and a projection of the first-stage internal ring gear in a radial direction of the first axis at least partially overlaps with a projection of the internal engagement portion in the radial direction of the first axis.

3. The torque output tool of claim 2, wherein the external engagement portion comprises an external engagement post, the internal engagement portion comprises an internal engagement post, and on a plane perpendicular to the first axis, a cross-sectional area of the external engagement post is greater than a cross-sectional area of the internal engagement post.

4. The torque output tool of claim 3, wherein the second-stage internal ring gear engages with the second planet gears and a lock, the second-stage internal ring gear comprises a plurality of bumps, the lock comprises locking teeth that mate with the plurality of bumps, the lock is capable of moving to at least a first position and a second position, the locking teeth and the plurality of bumps are staggered in a circumferential direction of the first axis when the lock is at the first position, and the locking teeth and the plurality of bumps are disengaged in the circumferential direction of the first axis when the lock is at the second position.

5. The torque output tool of claim 4, further comprising a toggle switch disposed on the housing and used for switching the lock to the first position or the second position; and a link that penetrates through the gearbox and connects the toggle switch to the lock.

6. The torque output tool of claim 1, wherein the gear ratio outputted by the first planetary gearset is greater than or equal to 10 and less than or equal to 18.

7. The torque output tool of claim 1, wherein, when the double-layer planetary gearset transmission assembly outputs the first gear ratio, a rotational speed of the output shaft is greater than or equal to 300 r/min and less than or equal to 800 r/min.

8. The torque output tool of claim 1, further comprising a torque adjustment ring sleeved on a front end of the gearbox and capable of moving forward and backward on the gearbox, an elastic member support connected to the torque adjustment ring, and an elastic member disposed on the elastic member support, wherein the elastic member support is at least partially sleeved on the torque adjustment ring such that the elastic member support at least partially overlaps with the torque adjustment ring in a radial direction of the first axis.

9. The torque output tool of claim 1, wherein the motor comprises a stator assembly and a rotor assembly, the rotor assembly comprises a rotor sleeve and permanent magnets, the permanent magnets are mounted on the rotor sleeve, the rotor sleeve is configured to be sleeved outside the stator assembly, and an output rotational speed of the motor is greater than or equal to 6400 r/min and less than or equal to 30000 r/min.

10. The torque output tool of claim 9, wherein the first gear ratio is greater than or equal to 16 and less than or equal to 36.

11. The torque output tool of claim 1, wherein the housing comprises a head housing in which the motor and the double-layer planetary gearset transmission assembly are disposed; and a grip connected to the head housing and used for a user to hold; wherein a length of the head housing in the axial direction of the first axis is configured to be greater than or equal to 80 mm and less than or equal to 120 mm.

12. A torque output tool, comprising:

an output shaft for outputting torque;

a motor for driving the output shaft to rotate around a first axis;

a double-layer planetary gearset transmission assembly for transmitting output of the motor to the output shaft;

a gearbox for accommodating at least a portion of the double-layer planetary gearset transmission assembly;

a torque adjustment ring sleeved on a front end of the gearbox and capable of moving forward and backward on the gearbox;

an elastic member support connected to the torque adjustment ring; and an elastic member disposed on the elastic member support, wherein the elastic member support is at least partially sleeved on the torque adjustment ring such that the elastic member support at least partially overlaps with the torque adjustment ring in a radial direction of the first axis, wherein the double-layer planetary gearset transmission assembly comprises:

a first planetary gearset comprising first planet gears and a first planet carrier, wherein the first planet gears are driven by the motor, and the first planet carrier is used for rotatably mounting the first planet gears; and a second planetary gearset comprising second planet gears and a second planet carrier, wherein the second planet carrier is used for mounting the second planet gears;

wherein the double-layer planetary gearset transmission assembly is capable of being switched to a first state and a second state such that the double-layer planetary gearset transmission assembly outputs a first gear ratio or a second gear ratio separately, and the first gear ratio is greater than the second gear ratio;

wherein when the double-layer planetary gearset transmission assembly outputs the first gear ratio, a rotational speed of the output shaft is greater than or equal to 300 r/min and less than or equal to 800 r/min; and wherein a length of the gearbox with the double-layer planetary gearset transmission assembly in an axial direction of the first axis is greater than or equal to 38 mm and less than or equal to 46 mm.

13. The torque output tool of claim 12, wherein the motor comprises a motor shaft that rotates around the first axis; the double-layer planetary gearset transmission assembly comprises a sun gear fixedly connected to the motor shaft; and a first planet gear of the first planet gears comprises an external engagement portion that forms external engagement with the sun gear and an internal engagement portion fixedly connected to the external engagement portion.

14. The torque output tool of claim 13, wherein the double-layer planetary gearset transmission assembly comprises a first-stage internal ring gear that forms internal engagement with the internal engagement portion, wherein a projection of the first-stage internal ring gear in a radial direction of the first axis at least partially overlaps with a projection of the internal engagement portion in the radial direction of the first axis.

15. The torque output tool of claim 14, wherein the external engagement portion comprises an external engagement post, the internal engagement portion comprises an internal engagement post, and on any plane perpendicular to the first axis, a cross-sectional area of the external engagement post is greater than a cross-sectional area of the internal engagement post.

16. The torque output tool of claim 15, wherein the double-layer planetary gearset transmission assembly comprises a second-stage internal ring gear engaged with the second planet gears and comprising a plurality of bumps; and a lock comprising locking teeth that mate with the plurality of bumps, wherein the lock is capable of moving to at least a first position and a second position, wherein, when the lock is at the first position, the locking teeth and the plurality of bumps are staggered in a circumferential direction of the first axis; and when the lock is at the second position, the locking teeth and the plurality of bumps are disengaged in the circumferential direction of the first axis.

17. The torque output tool of claim 12, wherein a gear ratio outputted by the first planetary gearset is greater than or equal to 10 and less than or equal to 18.

18. A power tool, comprising:

an output member;

a motor for driving the output member;

a double-layer planetary gearset transmission assembly for transmitting output of the motor to the output member; and a gearbox for accommodating at least a portion of the double-layer planetary gearset transmission assembly;

wherein the double-layer planetary gearset transmission assembly comprises:

a first planetary gearset comprising first planet gears and a first planet carrier, and a second planetary gearset comprising second planet gears and a second planet carrier, wherein the second planet carrier is used for mounting the second planet gears, wherein each of the first planet gears comprises:

an external engagement portion comprising external engagement teeth that engage with a sun gear and do not mesh with any internal ring gear, and an internal engagement portion comprising internal engagement teeth that rotate synchronously with the external engagement teeth and engage with a first-stage internal ring gear, wherein the external engagement teeth are fixedly connected with the internal engagement teeth, the first planet carrier is used for mounting the first planet gears, and the internal engagement portion is disposed at a front side of the external engagement portion, and a diameter of an addendum circle of the internal engagement teeth is less than a diameter of the addendum circle of the external engagement teeth, and wherein the double-layer planetary gearset transmission assembly is capable of being switched to a first state and a second state such that the double-layer planetary gearset transmission assembly outputs a first gear ratio or a second gear ratio separately, wherein the first gear ratio is greater than the second gear ratio, and the first planetary gearset provides a gear ratio greater than or equal to 10 and less than or equal to 18.

19. The power tool of claim 18, wherein the first planetary gearset is disposed at a side of the second planetary gearset close to the motor or on a side of the second planetary gearset away from the motor.

20. The power tool of claim 18, wherein the transmission assembly further comprises a second-stage internal ring gear for engaging with the second planet gears, the second-stage internal ring gear is configured to be switched to a first position or a second position, the first planet carrier or the second planet carrier is provided with engaging teeth, the second-stage internal ring gear engages with the second planet gears and is fixed relative the gearbox in a circumferential direction when the second-stage internal ring gear is in the first position, and the second-stage internal ring gear engages with the second planet gears and the engaging teeth and is rotatable relative the gearbox in a circumferential direction when the second-stage internal ring gear is in the second position.

21. The power tool of claim 20, wherein the double-layer planetary gearset transmission assembly is located in the first state when the second-stage internal ring gear is in the first position, the double-layer planetary gearset transmission assembly is located in the second state when the second-stage internal ring gear is in the second position, and a length of the gearbox in an axial direction is greater than or equal to 38 mm and less than or equal to 46 mm.

22. The power tool of claim 18, wherein a length of a body portion in a front direction and a rear direction is greater than or equal to 110 mm and less than or equal to 140 mm.

* * * * *